United States Patent
Takeyama et al.

(10) Patent No.: US 7,616,848 B2
(45) Date of Patent: Nov. 10, 2009

(54) OPTICAL TRANSMISSION APPARATUS

(75) Inventors: Tomoaki Takeyama, Kawasaki (JP);
Keiko Sasaki, Kawasaki (JP);
Shinichirou Muro, Kawasaki (JP);
Etsuko Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 477 days.

(21) Appl. No.: 11/709,729

(22) Filed: Feb. 23, 2007

(65) Prior Publication Data

US 2007/0274725 A1 Nov. 29, 2007

(30) Foreign Application Priority Data

Mar. 31, 2006 (JP) .............................. 2006-099844

(51) Int. Cl.
*G02B 6/26* (2006.01)
(52) U.S. Cl. .............................. 385/24; 385/15; 398/43; 398/79; 398/93
(58) Field of Classification Search .................. 385/15, 385/24; 398/43, 79, 93
See application file for complete search history.

(56) References Cited

U.S. PATENT DOCUMENTS

| 6,570,703 | B2 | 5/2003 | Murakami et al. |
| 6,577,652 | B1 | 6/2003 | Kamata |
| 6,646,792 | B2 | 11/2003 | Nakamura |
| 7,397,406 | B2 * | 7/2008 | Amemiya .................... 341/143 |
| 7,536,108 | B2 * | 5/2009 | Hirano et al. ................ 398/147 |

FOREIGN PATENT DOCUMENTS

| JP | 2000-4213 | 1/2000 |
| JP | 2002-57394 | 2/2002 |
| JP | 2002-368315 | 12/2002 |

\* cited by examiner

*Primary Examiner*—Jennifer Doan
(74) *Attorney, Agent, or Firm*—Staas & Halsey LLP

(57) ABSTRACT

In an optical transmission apparatus, optical power of each of wavelength contained in a wavelength multiplexing signal is measured, a measured value of the optical power of each wavelength is compared with a predetermined threshold value, a total value of the measured values of the optical power, which are equal to or larger than the threshold value, is calculated as a total value of signal beam power, and a total value of the measured values of the optical power, which are less then the threshold value, is calculated as a total value of ASE power. The number of the measured values of the optical power, which are equal to or larger than the threshold value, is calculated as a wavelength count of the signal beams contained in the wavelength multiplexing signal. A signal-to-ASE ratio is calculated from the total value of the signal beam power and the total value of the ASE power. The optical power of the wavelength multiplexing signal inputted to an optical amplifier is measured, and a target value of the automatic level control (ALC) is determined by use of the measured values of the wavelength count, the signal-to-ASE ratio and the optical power of the wavelength multiplexing signal in order to execute the ALC of the optical amplifier so that the optical power of each of the wavelengths in the wavelength multiplexing signal outputted from the optical amplifier, becomes constant.

3 Claims, 8 Drawing Sheets

OPTICAL TRANSMISSION APPARATUS

BACKGROUND OF THE INVENTION

1. Field of the Invention

The present invention relates to an optical transmission apparatus from and to which a signal beam is added and dropped, whereby the number of signal wavelengths is arbitrarily changed.

2. Description of the Related Art

With advancements of multimedia networks, demands for communication traffics have shown a big leap, and a WDM (Wavelength Division Multiplexing) transmission system using optical amplifiers that multi-relay-amplify optical signals, is performing a significant role in terms of economizing the communication systems in a multimedia society.

Over the recent years, the WDM system has positively been introduced into an intra-urban metro core network that puts an emphasis on cost and size. Along with this, introduction of an optical add drop multiplexer (OADM) into each of stations configuring the WDM system is advancing.

FIG. 8 shows a conventional configuration of the OADM apparatus (node) serving as an optical transmission apparatus. A configuration of an optical circuit is such that an SV (Supervisory) filter 1 demultiplexes (splits) only an SV optical beam from a WDM signal beam and the SV optical beam (Supervisory signal beam) transmitted from a transmission path, and an O/E (optical/electrical) converter 2 converts the optical beam into an electric signal.

The WDM signal beam is demultiplexed into wavelengths corresponding to channels (ch) by use of an AWG (Arrayed Waveguide Grating) 3. Further, with respect to each of the channels, an optical switch 4 adds and drops the signal beam. The added or transmitted-through signal beams are again multiplexed by an AWG 5.

The multiplexed WDM signal beam is, after being amplified by an EDFA (Erbium-Doped Fiber-Optical Amplifier) 9 including a demultiplexer (optical branching filter) 7 for monitoring input power to an amplifier 6 and also a photo detector (e.g., photo diode) 8, multiplexed by a multiplexer (optical branching filter) 11 with the SV optical beam generated by an E/O (electrical/optical) converter 10, and is thereafter transmitted to a transmission path.

As for a control circuit, a node number information receiving circuit 12 obtains information (drop node number), indicating a node that dropped a signal beam in a channel per channel, the drop node numbers are obtained from a supervisory (SV) signal acquired through the SV optical beam O/E conversion conducted by the O/E converter 2. The drop node number is set in the SV signal in a node disposed on upper side when dropping a signal beam. The node number information receiving circuit 12 calculates, based on the drop node number, how many nodes an ASE (Amplified Spontaneous Emission) beam reaches a node itself via (the number of nodes via which the ASE beam travels: ASE transmission node count) on the basis of the drop node number with respect to every channel.

An ASE power calculation circuit 15 calculates ASE power of each channel from the ASE information described above and from a relational expression (a block 14 in FIG. 8) between the ASE transmission node count and the ASE power, which is stored beforehand as information in the node, and further calculates a sum of values of the ASE power of the respective channels. This item of ASE power information is sent to the EDFA 9. Moreover, a wavelength count information receiving circuit 13 calculates the number of wavelengths (wavelength count) including the signal from the supervisory (SV) signal obtained by the O/E converter 2, and the wavelength count information is sent to the EDFA 9. These items of information are inputted to an ALC (Automatic Level Control) target value determination circuit 16 provided in the EDFA 9.

The ALC target value determination circuit 16 calculates and determines, based on ASE power information, the wavelength count information and input total power (S (signal)+ASE) information obtained by a photo detector 8 for input power of the EDFA 9, such an ALC (Automatic Level Control: output fixing control) target value of output total power (S+ASE) that a signal output of each channel from the amplifier 6 becomes fixed or a constant.

The amplifier 6 includes an ALC control circuit, and the ALC control circuit performs the automatic level control (ALC) of controlling a gain of the amplifier 6 so that the power (output total power) of the signal beam outputted from the amplifier 6 becomes the ALC target value.

Note that the drop node number obtained by the node number information receiving circuit 12 and the information (the node number of the self-node, which is defined as the drop node number) showing that the signal is dropped at a SW 4, are sent to a node number information transmitting circuit 17 and are transmitted as node number information to the E/O converter 10. Further, the wavelength count information acquired by the wavelength count information receiving circuit 13 and the information (the information on the wavelength (of the signal) added from the self-node) representing that the signal is added at the SW 4, are given to a wavelength count information transmitting circuit 18. The wavelength count information transmitting circuit 18 inputs the wavelength count information to the E/O converter 10. The E/O converter 10 generates the SV optical beam containing the node number information and the wavelength count information, and transmits this SV optical beam to the multiplexer 11.

A technology disclosed in, e.g., the following Patent document 1 is given as the prior art related to the present invention.

[Patent document 1] Japanese Patent Application Laid-Open Publication No. 2000-4213

In the prior art illustrated in FIG. 8, however, acquisition of the information on the ASE power defined as a parameter for determining the ALC target value involves obtaining the node number information and the wavelength count information by use of an SV channel. Required therefore are the O/E converter 2 and the E/O converter 10 for the SV channel, and the electric circuits for transmitting and receiving the node number information and the wavelength count information between the neighboring nodes, such as the node number information receiving circuit 12, the wavelength count information receiving circuit 13, the node number transmitting circuit 17 and the wavelength count information transmitting circuit 18. Moreover, the system gets complicated enough to need to multiplex and demultiplex the SV beam with respect to the WDM signal in order to perform the communications (transmission and reception of the SV beam) between the nodes.

Moreover, the SV-beam-based information is transferred sequentially via an SV beam transmitting/receiving circuit provided in each node from the most uplink node. In terms of such a characteristic, a length of transfer time on the order of several hundreds of milliseconds [ms] is required, and the ALC control might be delayed corresponding to this transfer time.

Further, generally, the ASE occurs within an amplification bandwidth of the optical amplifier and can be monitored with a wavelength off a signal bandwidth including the channels, however, according to the prior art illustrated in FIG. 8, the WDM signal beam is demultiplexed into the respective channels and again multiplexed by the AWG 5, in which process the optical beam off the signal band including the channels is not outputted, and hence the ASE can not be monitored with the wavelength off the signal band including the channels.

SUMMARY OF THE INVENTION

It is an object of the present invention to provide an optical transmission apparatus enabling the proper automatic level control while simplifying the configuration.

The present invention adopts the following means in order to accomplish the object described above.

Namely, the present invention is an optical transmission apparatus comprising:

an optical demultiplexer to receive and to demultiplex a wavelength multiplexing signal into wavelengths each corresponding to one of channels;

a unit to measure optical power of each of the wavelengths;

an optical multiplexer to generate a wavelength multiplexing signal into which the wavelengths are multiplexed;

an optical amplifier to amplify the multiplexed wavelength multiplexing signal;

a unit to compare a measured value of the optical power of each of the wavelengths with a predetermined threshold value;

a unit to calculate a total value of the measured values of the optical power that are equal to or larger than the threshold value, as a total value of a signal beam power;

a unit to calculate a total value of the measured values of the optical power that are less than the threshold value, as a total value of an amplified spountaneous emission (ASE) power;

a unit to calculate a number of the measured values of the optical power that are equal to or larger than the threshold value, as a wavelength count of the signal beams contained in the wavelength multiplexing signal;

a unit to calculate a ratio of a total value of the signal beam power to a total value of the ASE power, as a signal-to-ASE ratio;

a unit to measure an optical power of the wavelength multiplexing signal inputted to the optical amplifier; and a unit to determine a target value of automatic level control by use of the wavelength count, the signal-to-ASE ratio and the measured value of the optical power of the wavelength multiplexing signal inputted to the optical amplifier, in order to execute an automatic level control of the optical amplifier so that the optical power of each of the wavelengths in the wavelength multiplexing signal outputted from the optical amplifier, becomes constant.

According to the present invention, it is determined by use of the threshold value whether the optical beam of each wavelength, which is contained in the wavelength multiplexing signal, is a signal beam or an ASE beam, and the S/ASE ratio is calculated based on the total value of values of the optical power of the signal beams and the total value of values of the optical power of the ASE beams. Further, the wavelength count is calculated from the number of the measured values of the signal beams.

Thus, in the optical transmission apparatus according to the present invention, the parameter for obtaining the target value of the automatic level control (ALC) is generated not from the SV channel information but from the wavelength multiplexing signal within the optical transmission apparatus itself. Hence, there is no necessity for the complicated configuration for transmitting and receiving the supervisory signal by use of the SV channel between the neighboring nodes as in the prior art. Namely, the configuration of the optical transmission apparatus is simplified.

Moreover, the parameter for obtaining the target value of the automatic level control is generated within the optical transmission apparatus itself, and therefore, unlike the prior art, it does not happen that the automatic level control is delayed due to a time-lag of arrival of the supervisory signal. Namely, the automatic level control can be speeded up.

Preferably, the optical transmission apparatus according to the present invention further comprises:

add/drop units disposed on optical paths corresponding to each of the channels provided between the optical demultiplexer and the demultiplexer, each of the wavelengths demultiplexed by the optical demultiplexer passing through one of the output paths and one of the add/drop units disposed thereon before reaching the optical multiplexer, each of the add/drop units dropping a signal beam passing through the optical path and adding a signal beam to the optical path, wherein the unit to measure the optical power of each of the wavelengths is disposed so as to receive optical beams corresponding to each of the channels that are outputted from each of the add/drop units, and includes a branching unit to make each of the optical beams that is received branch into a first direction toward said the optical multiplexer and into a second direction, and a photo detecting unit detecting the power of the optical beam that branches into the second direction.

Still further, preferably, the optical transmission apparatus according to the present invention further comprises:

a splitting unit to split the wavelength multiplexing signal into two directions;

a first wavelength selecting switch selecting and dropping a signal beam having a predetermined wavelength that is contained in the wavelength multiplexing signal split into one direction from the splitting unit; and a second wavelength selecting switch adding a signal beam having a predetermined wavelength to the wavelength multiplexing signal split into the other direction from the splitting unit, wherein the unit to measure the optical power of each of the wavelengths includes an optical channel monitor unit to measure a optical power of each of the wavelengths contained in the wavelength multiplexing signal outputted from the second wavelength selecting switch.

According to the present invention, it is possible to provide the optical transmission apparatus enabling the proper automatic level control while simplifying the configuration.

Moreover, even in the case of employing the device such as the AWG that does not output the optical beam off the signal band containing the channels, the proper automatic level control can be done by measuring an ASE quantity.

DETAILED DESCRIPTION OF THE PREFERRED EMBODIMENT

An embodiment of the present invention will hereinafter be described with reference to the drawings. A configuration in the following embodiment is an exemplification, and the present invention is not limited to the configuration in the embodiment.

Outline of Embodiment

Figure 1:
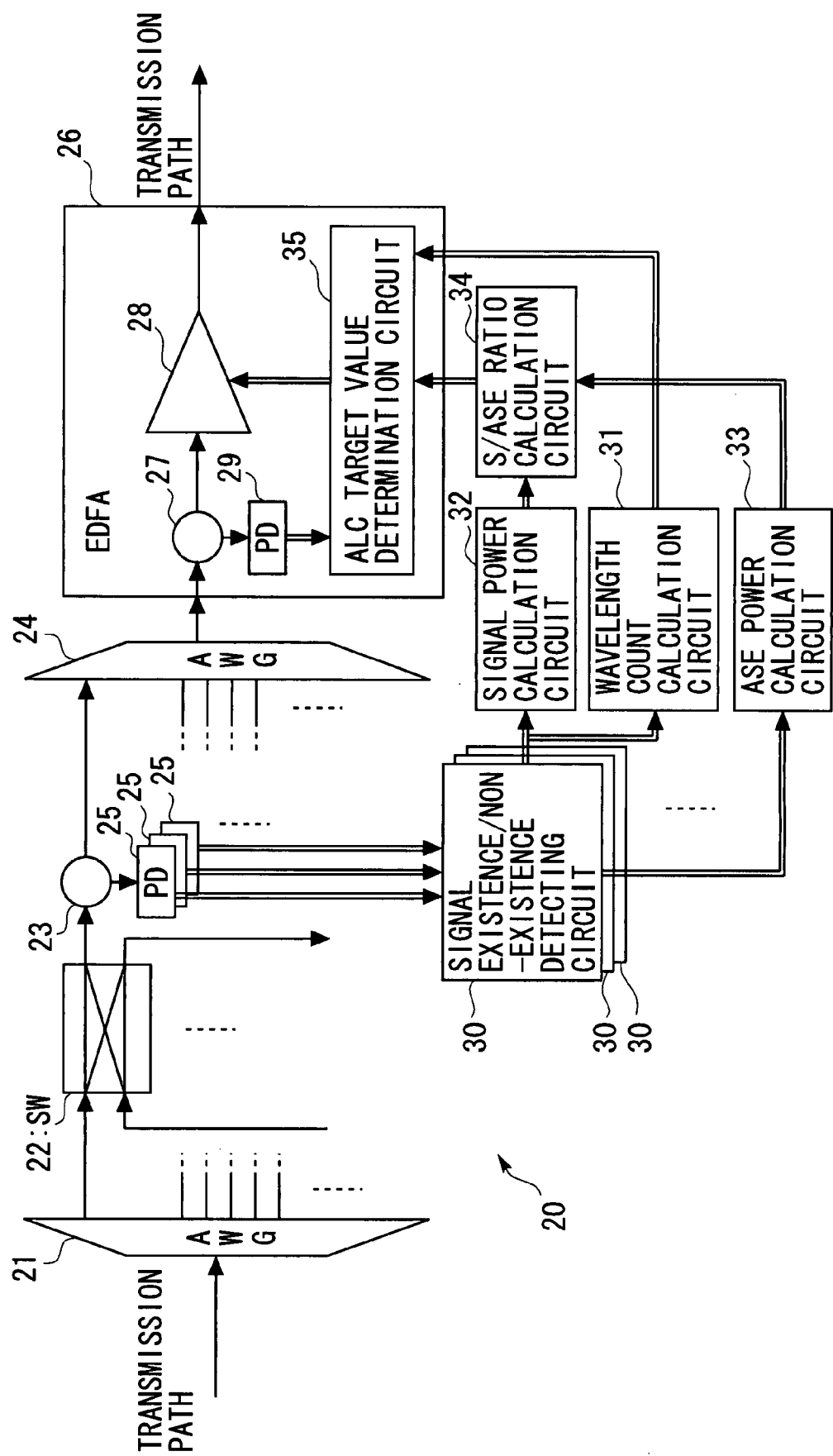
FIG. 1 is a diagram showing an example of a first configuration of an optical transmissions apparatus in an embodiment of the present invention.
Figure 2:
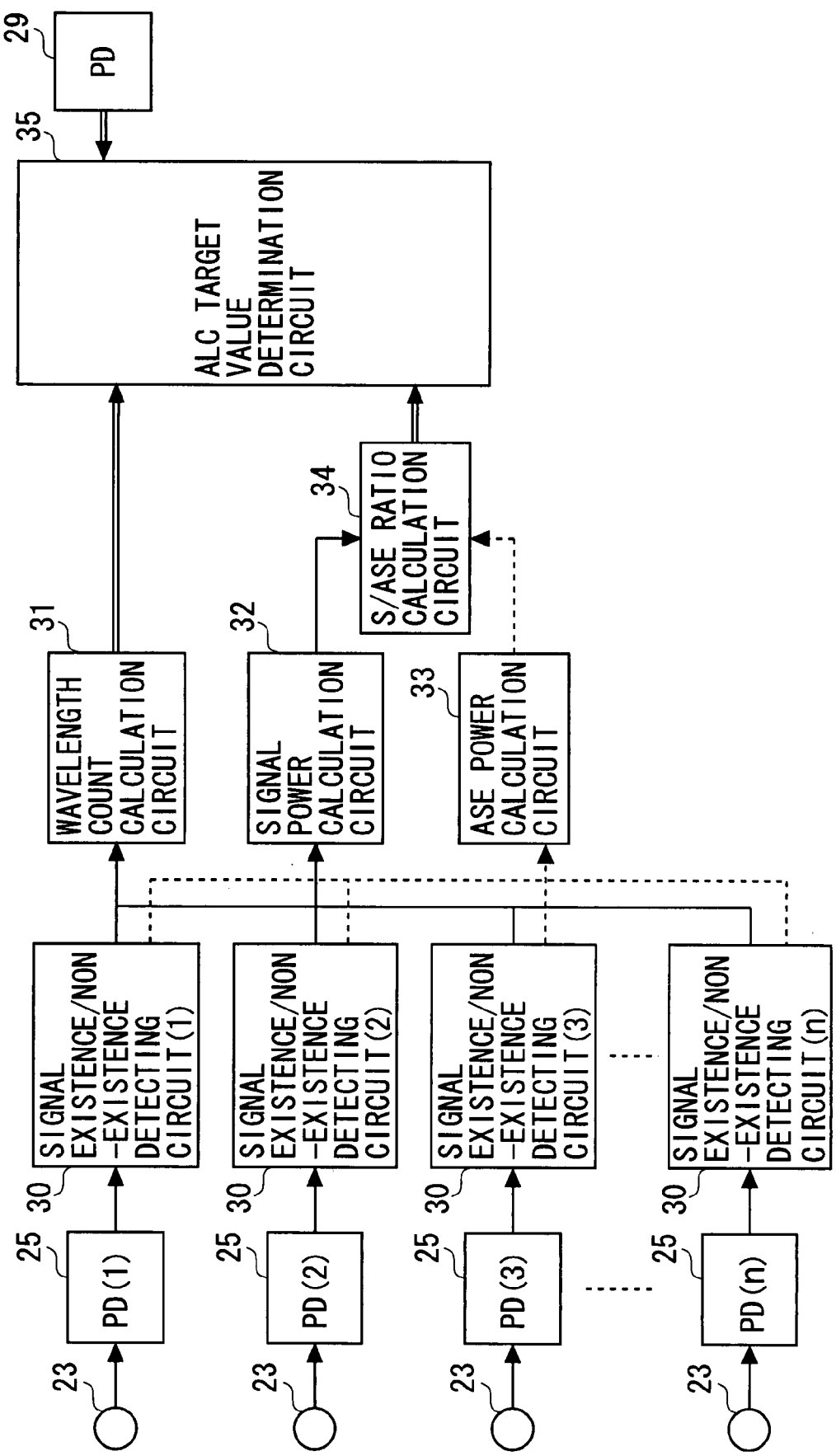
FIG. 2 is a diagram showing a configuration of a control circuit of the optical transmission apparatus illustrated in FIG. 1.

FIGS. 1 and 2 are diagrams showing an example of a configuration of an optical transmission apparatus (an OADM device: node) according to an embodiment of the present invention. The optical transmission device 20 as a optical transmission apparatus is disposed on a transmission path for WDM signals together with other nodes in a state of being connected in series to those other nodes.

In FIG. 1, the optical transmission device 20 has the following configuration as a configuration of an optical circuit. An AWG (Arrayed Waveguide Grating) 21 serving as an optical demultiplexer (optical branching filter) is connected to the transmission path on an uplink(upper)side. A WDM signal(wavelength division multiplexing signal) transmitted from the transmission path is inputted to the AWG 21. The AWG 21 demultiplexes the WDM signal into respective channels (wavelengths: the number of channels (channel count) n (n is a natural number excluding 0).

Optical switches (SWs) 22 serving as add/drop units are disposed on optical paths for optical beams corresponding to the respective channels. The SW 22 is prepared for every channel (FIG. 1, however, illustrates only one SW 22). The SW 22 drops the optical beam having a corresponding wavelength to the node itself and adds the optical beam having the corresponding wavelength from the node itself.

A beam splitter 23 (splitting unit) that splits part of the optical beam emanating from the SW 22 in two directions is provided on the optical path on an output side of the SW 22. The optical beam split in one direction (a first direction) from the beam splitter 23 is inputted into an AWG 24 serving as a optical multiplexer (optical branching filter) that multiplexes a plurality of channels. On the other hand, the optical beam split in the other direction (a second direction) from the beam splitter 23 is inputted to a photo detector (PD: Photo Detector (Photo Diode)) 25. The beam splitter 23 and the PD 25 are prepared for every channel.

The WDM signal multiplexed by the AGW 24 is inputted to an EDFA (Erbium-Doped Fiber-Optical Amplifier) 26. The EDFA 26 includes a beam splitter 27 that splits the WDM signal incident upon the beam splitter 27 from the AWG 24 in two directions, an optical amplifier 28 to which the WDM signal split in one direction from the beam splitter 27 is inputted, and a photo detector (PD) 29 to which the WDM signal split in the other direction from the beam splitter 27 is inputted. The optical amplifier 28 amplifies the WDM signal and outputs the amplified WDM signal. The WDM signal outputted from the optical amplifier 28 is transmitted to a transmission path on a downlink (lower) side.

Further, the optical transmission device 20 has the following configuration as a configuration of a control circuit. To be specific, as shown in FIG. 2, the optical transmission device 20 includes a plurality of signal existence/non-existence detecting circuits 30 each connected to the PD 25 for every channel. A wavelength count calculation circuit 31, a signal power calculation circuit 32 and an ASE (Amplified Spontaneous Emission) power calculation circuit 33 are connected to each of the plurality of signal existence/non-existence detecting circuits 30. The signal power calculation circuit 32 and the ASE power calculation circuit 33 are connected to an S/ASE (Signal-to-ASE) ratio calculation circuit 34. The S/ASE ratio calculation circuit 34 is connected to an ALC (Automatic Level Control) target value determination circuit 35 provided within the EDFA 26. The ALC target value determination circuit 35 is connected to a PD 29.

Each PD 25 detects the optical beam (converts the optical beam into an electric signal), and monitors (measures) optical power of this channel. A measured value (monitor value) of the optical power is inputted to the signal existence/non-existence detecting circuit 30 corresponding thereto.

The signal existence/non-existence detecting circuit 30 has a predetermined threshold value and determines whether or not the measured value of the inputted optical power exceeds the threshold value, thereby determining whether the signal beam exists in this channel or not. The signal existence/non-existence detecting circuit 30 compares the measured value with the threshold value. At this time, if the measured value exceeds the threshold value, the signal existence/non-existence detecting circuit 30 determines that the signal beam exists in the channel, and outputs the measured value to the wavelength count calculation circuit 31 and to the signal power calculation circuit 32. Whereas if the measured value does not exceed the threshold value, the signal existence/non-existence detecting circuit 30 determines that the signal beam does not exist in the channel (judges that only the ASE beam exists), and outputs the measured value to the ASE power calculation circuit 33.

The wavelength count calculation circuit 31 calculates a wavelength count (the number of wavelengths) of the WDM signal amplified by the EDFA 26 in a way that counts the number of the measured values inputted from the signal existence/non-existence detecting circuit 30. The wavelength count calculation circuit 31 inputs the calculated wavelength count to the ALC target value determination circuit 35 serving as a determination unit.

The signal power calculation circuit 32 calculates a total value of the measured values inputted from the signal existence/non-existence detecting circuits 30, and inputs this total value as total signal beam power to the S/ASE ratio calculation circuit 34. The ASE power calculation circuit 33 calculates a total value of the measured values inputted from the signal existence/non-existence detecting circuits 30, and inputs this total value as total ASE power to the S/ASE ratio calculation circuit 34.

The S/ASE ratio calculation circuit 34 calculates an S/ASE ratio (Signal-to-ASE ratio) from a ratio of the total signal beam power to the total ASE power, and inputs this S/ASE ratio to the ALC target value determination circuit 35.

The ALC target value determination circuit 35 receives, in addition to the wavelength count and the S/ASE ratio, a measured value of the power of the WDM signal (signal beam+ASE beam) inputted to the optical amplifier 28 as input total power (S (Signal)+ASE) from the PD 29. The ALC target value determination circuit 35 calculates and determines, by use of these pieces of information, such an output total power control target value (ALC target value) that signal outputs of the respective channels become fixed.

The optical amplifier 28 includes an ALC control circuit, and the ALC target value determined by the ALC target value determination circuit 35 is set in this ALC control circuit. The ALC control circuit executes ALC control based on the ALC target value. Namely, the ALC control circuit controls a gain of the optical amplifier 28 corresponding to an error between the WDM signal (optical output) outputted from the optical amplifier 28 and the ALC target value so that the signal outputs of the respective channels become fixed (constant) in the WDM signal outputted from the optical amplifier 28.

Figure 8:
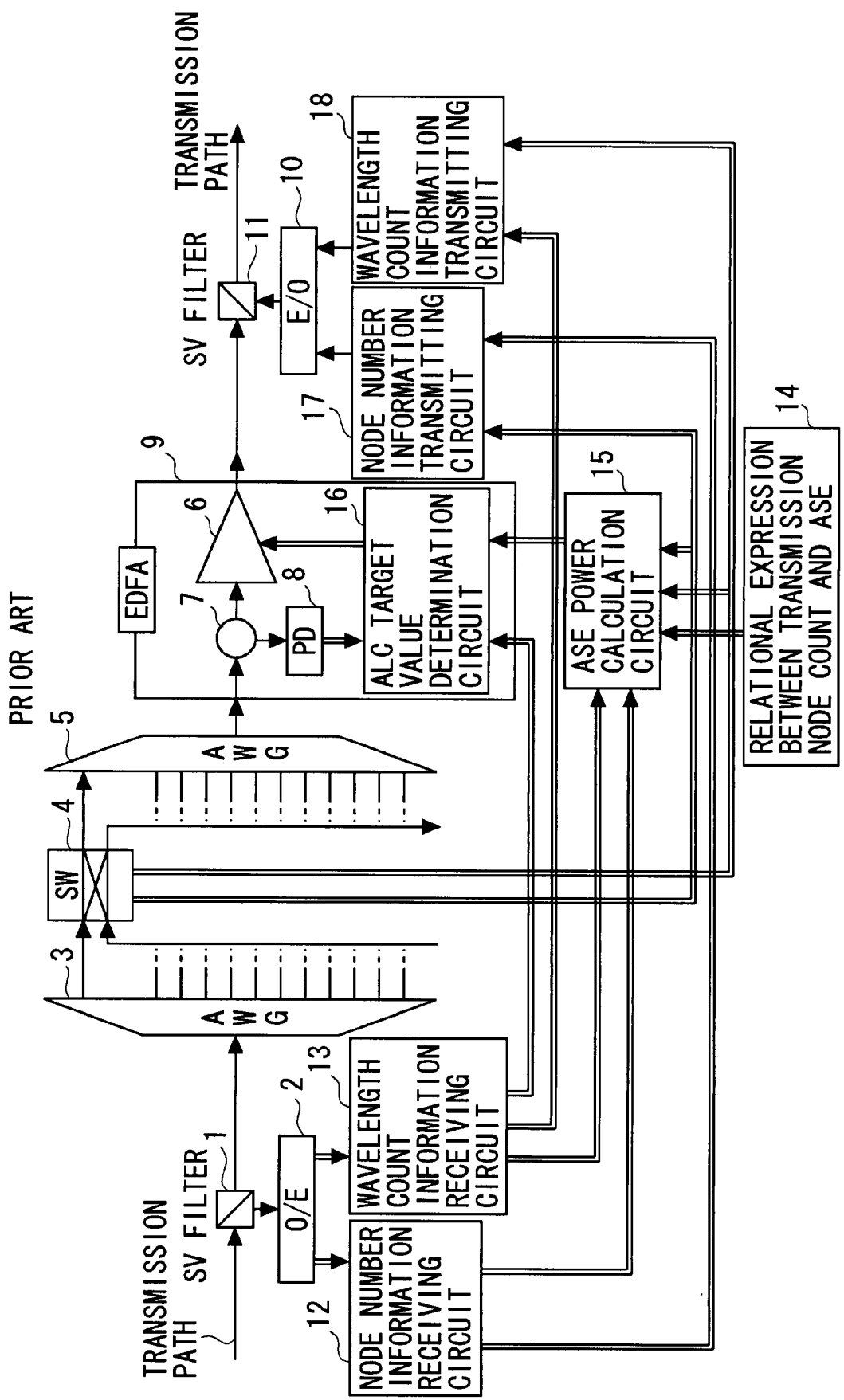
FIG. 8 is a diagram showing an example of a configuration of an optical transmission apparatus in the prior art.

The optical transmission device 20 has omissions of the supervisory signal channel (SV channel) and the electric circuits (the O/E converter, the E/O converter, the node number information receiving/transmitting circuit, the wavelength count information receiving/transmitting circuit) related to this supervisory signal channel as explained in the Prior Art (FIG. 8). Further, the configuration for transmitting and receiving the SV beam between the neighboring nodes is also omitted. Accordingly, the device configuration is simpler than by the prior arts.

Moreover, in the optical transmission device 20, the information for calculating the ALC target value is transferred and received in a closed mode within the node itself, and it is therefore possible to actualize an ALC control speed that is as sufficiently high as several tens of microseconds [μs].

SPECIFIC EXAMPLE

A detailed example (specific example) of the optical transmission device 20 illustrated in FIGS. 1 and 2 will be explained by way of a specific example. A presumption is that a maximum wavelength count applied to the optical transmission device 20 is "40" (40 wavelengths), and a transmission node count till the signal beam reaches the optical transmission device 20 (node itself) is "16" (16 nodes). A bandwidth of each of the AWGs 21 and 24 is on the order of 0.1 [nm]. Further, it is assumed that a receiving OSNR (Optical Signal-to-Noise Ratio) in the one-node transmission is on the order of 26 [dB], and the signal beam power in the photo detector (PD) 23 is on the order of −10 [dBm/ch].

Figure 3:
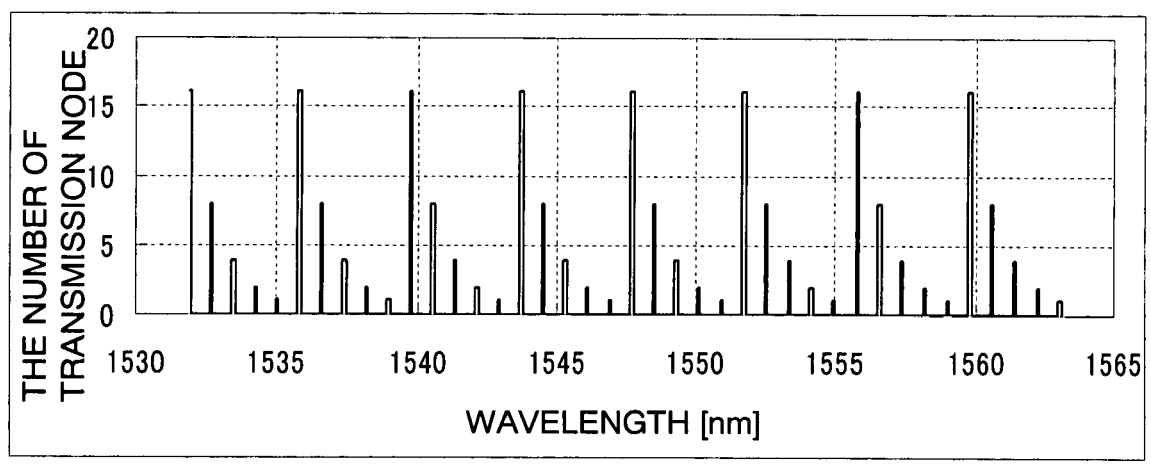
FIG. 3 is a diagram showing a typical pattern in which a spectral configuration of ASE getting incident on an EDFA becomes complicated.

Furthermore, cases as shown in FIG. 3 are assumed as typical patterns in which a spectral configuration of the ASE getting incident on the EDFA 26 becomes complicated. Namely, the following are the typical patterns.

(1) A state is that the signal beam exists in only a channel (Ch) 1and is transmitted via the 16 nodes (16-node transmission).

(2) A state is such that none of the signal beam exists in Ch 6, Ch 11, Ch 16, Ch 21, Ch 26, Ch 31and Ch 36, and only the ASE is transmitted via the 16 nodes;

(3) A state is that in Ch 7, Ch 12, Ch 17, Ch 22, Ch 27, Ch 32and Ch 37, the signal beam is dropped after the 8-node transmission, and thereafter only the ASE is transmitted via the 8 nodes.

(4) This is a state where in Ch 8, Ch 13, Ch 18, Ch 23, Ch 28, Ch 33and Ch 38, the signal beam is dropped after the 12-node transmission, and thereafter only the ASE is transmitted via the 4 nodes.

(5) This is a state where in Ch 9, Ch 14, Ch 19, Ch 24, Ch 29, Ch 34and Ch 39, the signal beam is dropped after the 14-node transmission, and thereafter only the ASE is transmitted via the 2 nodes.

(6) A state is such that in Ch 10, Ch 15, Ch 20, Ch 25, Ch 30, Ch 35and Ch 40, the signal beam is dropped after the 15-node transmission, and thereafter only the ASE is transmitted via the 1 node.

Figure 4:
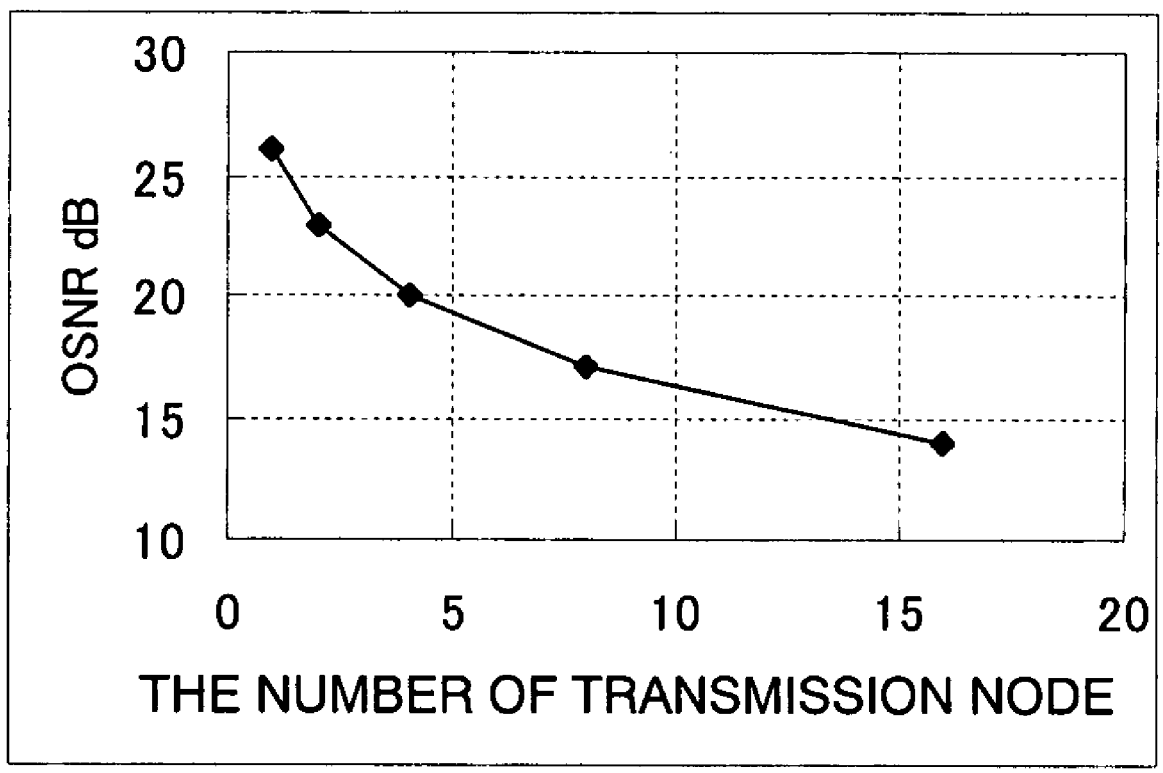
FIG. 4 is a graph showing a relationship between a transmission node count and OSNR.

The transmission node count and the OSNR have a relationship expressed by a graph shown in FIG. 4. Further, the transmission node count and the ASE power of each channel, which is detected by the PD 23, have a relationship expressed by a graph shown in FIG. 5.

Figure 6:
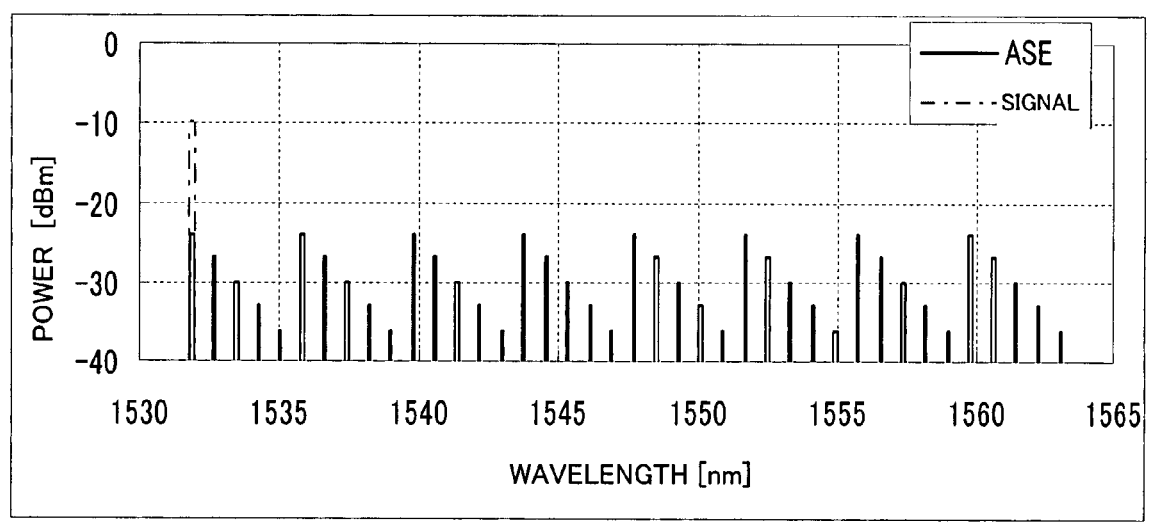
FIG. 6 is a graph showing signal beams and spectrums of the ASE power that are detected by the photo detectors of the respective channels.

FIG. 6 is a graph showing spectrums of the signal beam and of the ASE power, which are detected by the PD 23 of each channel. The WDM signal having these spectrums (signal beam+ASE) is inputted to the EDFA 26.

Figure 5:
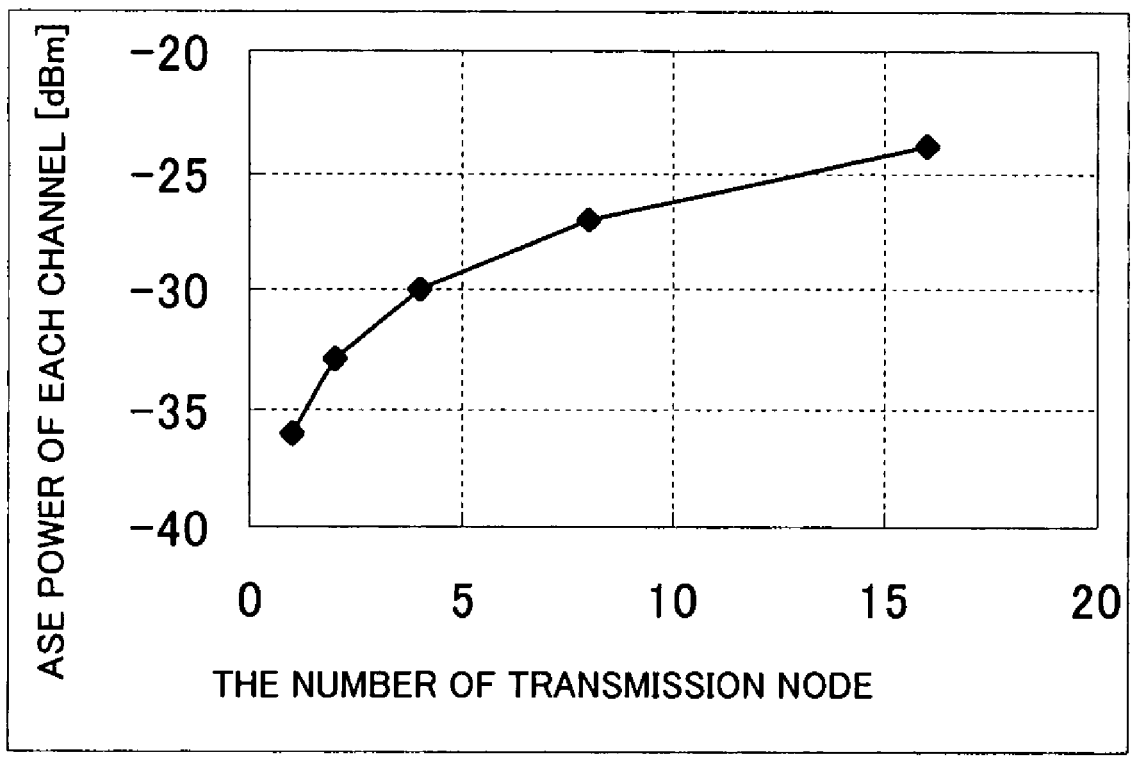
FIG. 5 is a graph showing a relationship between the transmission node count and ASE power detected by a photo detector of each channel.

The threshold value set in each signal existence/non-existence detecting circuit 30 is determined by, e.g., the following method. Namely, as illustrated in FIG. 5, the ASE is, even when undergoing the 16-node transmission, equal to or smaller than −24 [dBm]. Hence, a numerical value equal to or larger than −24 [dBm] is determined as the threshold value. In this example, −23 [dBm] is determined as the threshold value.

The signal existence/non-existence detecting circuit 30, if the receiving power in the PD 23 is equal to or larger than −23 [dBm], judges that this receiving power (measured value) is the signal beam power (i.e., the channel contains the signal beam). By contrast, if the receiving power is smaller than −23 [dBm], the signal existence/non-existence detecting circuit 30 judges that the receiving power is only the ASE power (i.e., the channel does not contain the signal beam). The existence or non-existence of the signal beam of each channel is detected based on these threshold values.

The signal power calculation circuit 32 calculates the total power (total signal beam power) of the channels where the signal beam exists. In this example, the total signal beam power calculated by the signal power calculation circuit 32 is on the order of −9.8 [dBm].

The ASE power calculation circuit 32 calculates the total power (total ASE power) of the channels where none of the signal beam exists. In this example, the total ASE power calculated by the ASE power calculation circuit 33 becomes −12.1 [dBm].

The S/ASE ratio calculation circuit 34 calculates the S/ASE ratio from the ratio of the total signal beam power to the total ASE power. In this instance, the S/ASE ratio calculated by the S/ASE ratio calculation circuit 34 is on the order of 2.1 [dB].

Moreover, the wavelength count calculation circuit 31 calculates, as a wavelength count, a total value (a total value of the receiving power measured values equal to or larger than the threshold value) of the channels where the signal beam exists. In this example, the wavelength count calculated by the wavelength count calculation circuit 31 is "1" (1 wavelength). The S/ASE ratio and the wavelength count are inputted to the ALC target value determination circuit 35 of the EDFA 26.

The ALC target value determination circuit 35 of the EDFA 26 calculates an ALC target value on the basis of the S/ASE ratio, the wavelength count and the input total power given from the PD 29. To begin with, the ALC target value determination circuit 35 calculates "Pase_in" by use of the following <Formula 1>. "Pase_in" is the ASE power inputted to the optical amplifier 28.

$$P\text{ase\_in}[mW] = P\text{total\_in}[mW]/1 + (S/ASE\ [\text{anti-logarithm}])\qquad <\text{Formula 1}>$$

In the <Formula 1>, "Ptotal_in" represents the input total power (S+ASE) inputted from the monitor PD (PD 29) on the input side of the optical amplifier 28 and then inputted to the optical amplifier 28. "S/ASE" represents the S/ASE ratio inputted from the S/ASE ratio calculation circuit 34. In this instance, "Ptotal_in" is on the order of 0.01 [mW]. Therefore, "Pase_in" calculated by the ALC target value determination circuit 35 becomes 0.0038 [mW].

Next, the ALC target value determination circuit 35 calculates "Psig_in" by employing the following <Formula 2>. "Psig_in" is defined as the signal beam power inputted to the optical amplifier 28.

$$P\text{sig\_in}[\text{mW/ch}]=(P\text{total\_in}[\text{mW}]-P\text{ase\_in}[\text{mW}])/(\text{Wavelength Count}) \quad \text{<Formula 2>}$$

In this example, "Psig_in" calculated by the ALC target value determination circuit 35 becomes 0.0061 [mW/ch].

Next, the ALC target value determination circuit 35 calculates "Pase_out" by using the following <Formula 3>. "Pase_out" represents the output ASE power in a case where the ASE is not contained in the input of the optical amplifier 28.

$$P\text{ase\_out}[\text{dBm}]=a*P\text{sig\_in}[\text{dBm/ch}]^2+b*P\text{sig\_in}[\text{dBm/ch}]+c \quad \text{<Formula 3>}$$

In the <Formula 3>, the symbol "^" indicates that a character subsequent to this symbol is an exponent (which is the same with <Formula 6> that will be described later on). Further, coefficients "a", "b" and "c" in the <Formula 3> are parameters that change depending on an ASE noise characteristic of the EDFA. In the case of the EDFA 26 employed in this example, the parameters are given such as a=0.0937, b=3.3786 and c=18.9855. Hence, "Pase_out" calculated by the ALC target value determination circuit 35 becomes −10 [dBm].

Next, the ALC target value determination circuit 35 calculates "Ek" by use of the following <Formula 4>. "Ek" is an ASE correction value of the optical amplifier 28 as a single unit in the case where the ASE is not contained in the input of the optical amplifier 28.

$$Ek[\text{dB}]=10*\log(1+P\text{ase\_out}[\text{mW}]/P\text{sig\_out Target Value}[\text{mW}])=10*\log(1+(P\text{ase\_out}[\text{mW}]/(P\text{sig\_out Target Value}[\text{mW/ch}]*(\text{Wavelength Count})) \quad \text{<Formula 4>}$$

In this instance, Psig_out Target Value (a target value of the signal output) is on the order of 1.0 [mW/ch]. Therefore, "Ek" calculated by the ALC target value determination circuit 35 becomes 0.42 [dB].

Next, the ALC target value determination circuit 35 calculates "Gsig Target Value" by using <Formula 5>, which is shown as below. "Gsig Target Value" is a target value of a signal gain.

$$G\text{sig Target Value}[\text{dB}]=P\text{sig\_out Target Value}[\text{dBm/ch}]-P\text{sig\_in}[\text{dBm/ch}] \quad \text{<Formula 5>}$$

In this example, "Gsig Target Value" calculated by the ALC target value determination circuit 35 becomes 22.1 [dB].

Subsequently, the ALC target value determination circuit 35 calculates "Ptotal_out Target Value" by employing <Formula 6> that is shown as follows. "Ptotal_out Target Value" is such an output total power control target value of the optical amplifier 28, i.e., such an ALC target value of the optical that the signal output of each channel gets fixed.

$$P\text{total\_out Target Value}[\text{mW}]=10^{((P\text{sig\_out Target Value}[\text{dBm}]+Ek[\text{dB}])/10)}+10^{((P\text{ase\_in}[\text{dBm}]+G\text{sig Target Value}[\text{dB}])/10)} \quad \text{<Formula 6>}$$

In this instance, "Ptotal_out Target Value" calculated by the ALC target value determination circuit 35 is on the order of 1.72 [mW]. "Ptotal_out Target Value" is set in the ALC control circuit of the optical amplifier 28. The ALC control circuit conducts the ALC control based on the "Ptotal_out Target Value".

Thus, the ALC control taking account of the ASE occurred in the output of the optical amplifier 28 is carried out, whereby the fixed signal output can be maintained for each channel, depending on neither the wavelength count nor the node into which the signal beam is dropped.

Next, in the specific example described above, the characteristic, which is required of the PD 23 of each channel, is given as follows. Namely, the maximum light receiving power is a sum of −24 [dBm] as a value of the ASE power and −10 [dBm] as a value of the signal beam power after the 16-node transmission, wherein this sum is on the order of −9.8 [dBm]. Moreover, the minimum light receiving power becomes −36 [dBm] as a value of the ASE power after the 1-node transmission. Accordingly, a required dynamic range is 26.2 [dB]. This is a characteristic that can be sufficiently actualized.

EXAMPLE OF SECOND CONFIGURATION

Figure 7:
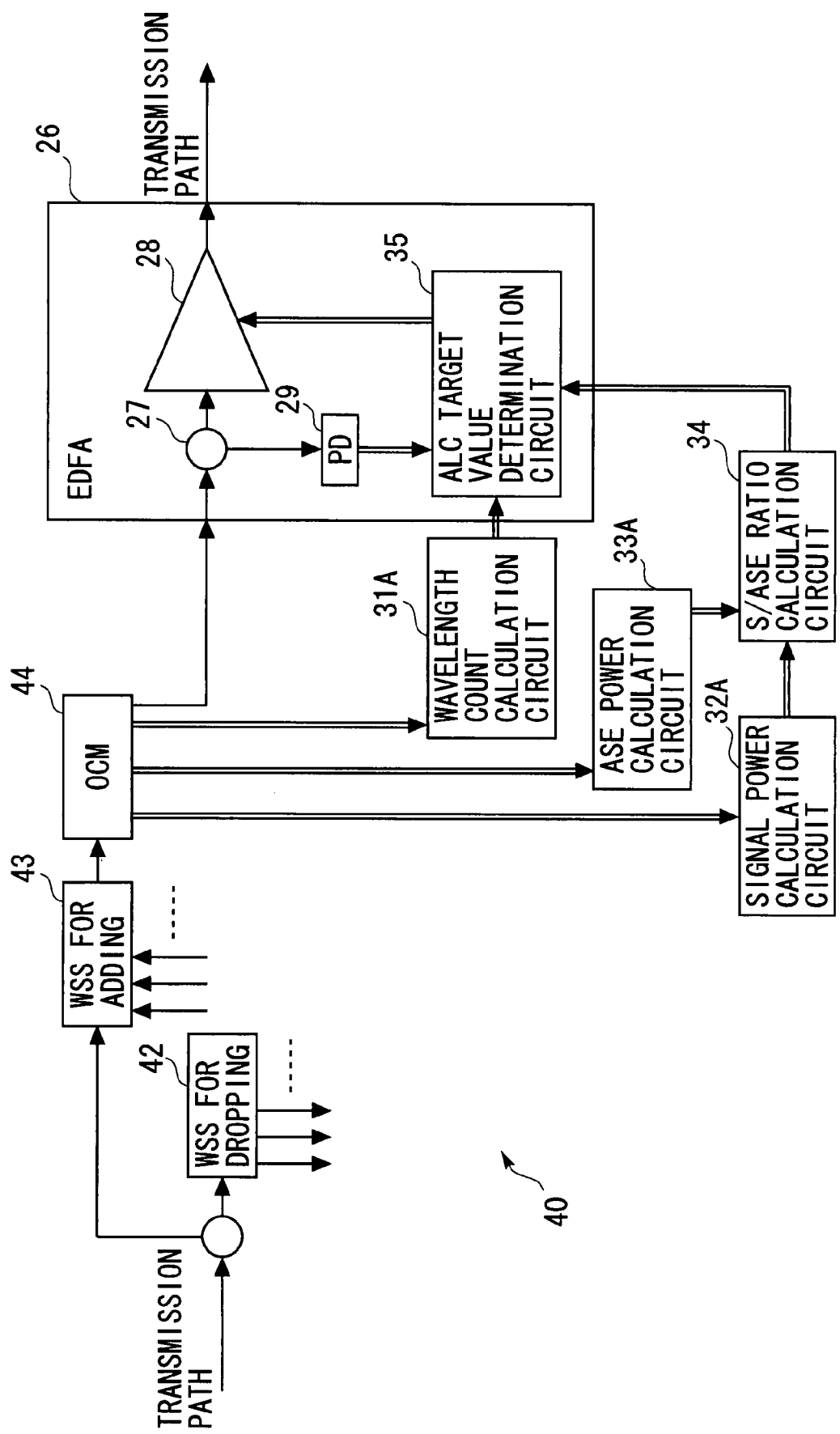
FIG. 7 is a diagram showing an example of a second configuration of the optical transmission apparatus in the embodiment of the present invention.

FIG. 7 is a diagram showing an example of a second configuration of the optical transmission apparatus (an optical transmission device 40) according to the embodiment of the present invention. In FIG. 7, the same components as those of the optical transmission device 20 (the example of the first configuration) illustrated in FIG. 1 are marked with the same symbols and numerals, and their explanations are omitted.

The optical transmission device 40 includes, as substitutes for the AWG 21, the SW 22 and the AWG 24 in the optical transmission device 20, a beam splitter 41 serving as a splitting unit, a WSS (Wavelength Selecting Switch) (a first wavelength selecting switch) 42 for dropping, and a WSS (a second wavelength selecting switch) 43 for adding. Further, the optical transmission device 40 has an OCM (Optical Channel Monitor) (an optical channel monitor unit) 44 in place of the beam splitter 23 and the PD 25 in the optical transmission device 20.

The beam splitter 41 splits the WDM signal (signal beam+ASE) transmitted from the transmission path on the uplink side into the WSS 42 and the WSS 43. The WSS 42 selects and drops the optical beam having a wavelength (channel) that should be dropped (from the transmission path) to the self-node (optical transmission device 40). The WSS 43 selects a wavelength of the signal beam, which should be added from the self-node (optical transmission device 40), and adds this signal beam (to the transmission path).

The OCM 44 monitors (measures) the optical power in each of the channels (1-n) and inputs the measured value of the optical power of each channel to a wavelength count calculation circuit 31A, a signal power calculation circuit 32A and an ASE power calculation circuit 33A.

The wavelength count calculation circuit 31A, which has a threshold value for judging the existence or non-existent of the signal beam that has been explained in the example of the first configuration, compares the optical power (measured value) of each channel that is inputted from the OCM 44 with the threshold value, counts the number of measured values equal to or larger than the threshold value, then calculates a total value thereof as a wavelength count, and inputs this wavelength count to the ALC target value determination circuit 35.

The signal power calculation circuit 32A, which has a threshold value for judging the existence or non-existent of the signal beam that has been explained in the example of the first configuration, compares the optical power (measured value) of each channel that is inputted from the OCM 44 with the threshold value, then calculates a total value of the measured values equal to or larger than the threshold value as total signal power, and inputs this total signal power to the S/ASE ratio calculation circuit 34.

The signal power calculation circuit 32A, which has a threshold value for judging the existence or non-existent of the signal beam that has been explained in the example of the first configuration, compares the optical power (measured value) of each channel that is inputted from the OCM 44 with the threshold value, then calculates a total value of the measured values less than the threshold value as total ASE power, and inputs this total ASE power to the S/ASE ratio calculation circuit 34.

The configurations of the S/ASE ratio calculation circuit 34 and of the EDFA 26 are the same as those in the example of the first configuration (the optical transmission device 20), and the EDFA 26 executes the ALC control by the method explained in the example of the first configuration so that the signal outputs of the respective channels in the outputs from the optical amplifier 28 get fixed.

Others

The disclosures of Japanese patent application No. JP 2006-099844 filed on Mar. 31, 2006 including the specification, drawings and abstract are incorporated herein by reference.

What is claimed is:

1. An optical transmission apparatus comprising:
   an optical demultiplexer to receive and to demultiplex a wavelength multiplexing signal into wavelengths each corresponding to one of channels;
   a unit to measure optical power of each of the wavelengths;
   an optical multiplexer to generate a wavelength multiplexing signal into which the wavelengths are multiplexed;
   an optical amplifier to amplify the multiplexed wavelength multiplexing signal;
   a unit to compare a measured value of the optical power of each of the wavelengths with a predetermined threshold value;
   a unit to calculate a total value of the measured values of the optical power that are equal to or larger than the threshold value, as a total value of a signal beam power;
   a unit to calculate a total value of the measured values of the optical power that are less than the threshold value, as a total value of an amplified spontaneous emission (ASE) power;
   a unit to calculate a number of the measured values of the optical power that are equal to or larger than the threshold value, as a wavelength count of the signal beams contained in the wavelength multiplexing signal;
   a unit to calculate a ratio of a total value of the signal beam power to a total value of the ASE power, as a signal-to-ASE ratio;
   a unit to measure an optical power of the wavelength multiplexing signal inputted to the optical amplifier; and
   a unit to determine a target value of automatic level control by use of the wavelength count, the signal-to-ASE ratio and the measured value of the optical power of the wavelength multiplexing signal inputted to the optical amplifier, in order to execute an automatic level control of the optical amplifier so that the optical power of each of the wavelengths in the wavelength multiplexing signal outputted from the optical amplifier, becomes constant.

2. An optical transmission apparatus according to claim 1, further comprising add/drop units disposed on optical paths corresponding to each of the channels provided between the optical demultiplexer and the optical multiplexer, each of the wavelengths demultiplexed by the optical demultiplexer passing through one of the output paths and one of the add/drop units disposed thereon before reaching the optical multiplexer, each of the add/drop units dropping a signal beam passing through the optical path and adding a signal beam to the optical path,
   wherein the unit to measure the optical power of each of the wavelengths is disposed so as to receive optical beams corresponding to each of the channels that are outputted from each of the add/drop units, and includes a branching unit to make each of the optical beams that is received branch into a first direction toward said the optical multiplexer and into a second direction, and a photo detecting unit detecting the power of the optical beam that branches into the second direction.

3. An optical transmission apparatus according to claim 1, further comprising:
   a splitting unit to split the wavelength multiplexing signal into two directions;
   a first wavelength selecting switch selecting and dropping a signal beam having a predetermined wavelength that is contained in the wavelength multiplexing signal split into one direction from the splitting unit; and
   a second wavelength selecting switch adding a signal beam having a predetermined wavelength to the wavelength multiplexing signal split into the other direction from the splitting unit, wherein the unit to measure the optical power of each of the wavelengths includes an optical channel monitor unit to measure an optical power of each of the wavelengths contained in the wavelength multiplexing signal outputted from the second wavelength selecting switch.

\* \* \* \* \*